United States Patent
Cheng et al.

(10) Patent No.: US 6,449,091 B1
(45) Date of Patent: *Sep. 10, 2002

(54) OPTICAL ISOLATOR

(75) Inventors: Yihao Cheng, Kanata; Neil Teitelbaum, Ottawa, both of (CA)

(73) Assignee: JDS Fitel Inc., Nepean ( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/754,032

(22) Filed: Dec. 3, 1996

(51) Int. Cl.[7] ............................. G02B 5/30; G02F 1/09; G01J 4/00
(52) U.S. Cl. .................. 359/484; 359/495; 359/497; 359/499; 359/501; 359/900; 359/281; 356/365; 356/367; 372/703
(58) Field of Search ................. 359/281, 282, 359/283, 484, 494, 495, 496, 497, 499, 500, 501, 900; 372/703; 356/364, 365, 366, 367

(56) References Cited

U.S. PATENT DOCUMENTS

| | | | | |
|---|---|---|---|---|
| 4,178,073 A | * | 12/1979 | Uchida et al. | 359/484 |
| 4,804,256 A | * | 2/1989 | Wilson | 359/484 |
| 4,909,612 A | * | 3/1990 | Scerbak et al. | |
| 4,981,335 A | * | 1/1991 | Gaebe | |
| 5,040,863 A | * | 8/1991 | Kawakami et al. | 359/484 |
| 5,052,786 A | * | 10/1991 | Schulz | 359/500 |
| 5,087,984 A | * | 2/1992 | Heiney et al. | 359/282 |
| 5,111,330 A | * | 5/1992 | Van Delden et al. | 359/484 |
| 5,121,451 A | * | 6/1992 | Grard et al. | |
| 5,127,072 A | * | 6/1992 | Blauvelt et al. | |
| 5,278,853 A | * | 1/1994 | Shirai et al. | 372/703 |
| 5,359,689 A | * | 10/1994 | Iwatsuka et al. | |
| 5,471,306 A | * | 11/1995 | Yui et al. | 356/367 |
| 5,612,813 A | * | 3/1997 | Damman et al. | 359/484 |
| 5,712,728 A | * | 1/1998 | Chen | 359/495 |
| 5,734,762 A | * | 3/1998 | Ho et al. | 385/11 |
| 5,737,349 A | * | 4/1998 | Gaebe | |
| 5,917,643 A | * | 6/1999 | Watanabe et al. | 359/484 |

FOREIGN PATENT DOCUMENTS

| | | | | |
|---|---|---|---|---|
| EP | 0640862 | | 3/1995 | |
| EP | 0814361 | | 12/1997 | |
| JP | 0076321 | * | 6/1980 | 359/484 |
| JP | 0113019 | * | 9/1980 | 359/484 |
| JP | 0222818 | * | 11/1985 | 359/484 |
| JP | 0118315 | * | 5/1987 | 359/484 |
| JP | 64-52119 | * | 2/1989 | 359/484 |
| JP | 3-1119 | * | 1/1991 | 359/484 |
| JP | 6-186502 | * | 7/1994 | 359/484 |

OTHER PUBLICATIONS

Kampel; "A Yig Radiometer and Temperature Controller"; Wireless World; Oct. 1970; pp. 501–504.*

* cited by examiner

Primary Examiner—Ricky D. Shafer
(74) Attorney, Agent, or Firm—Neil Teitelbaum

(57) ABSTRACT

Tuning to maximize the isolation provided by an optical isolator to one of a predetermined plurality of wavelengths is achieved by tilting the isolator with respect to an input beam of light. Further tuning to a peak response for a given wavelength is achieved by rotation of the isolator about its longitudinal axis while or after tilting. In the manufacture of the isolator a test beam is launched into an output port end directed toward the input end. Tilting, or tiling and rotating is initiated and light at the input end is measured while tilting/rotating. When the position is determined where the minimal amount of light is measured, the optical elements are glued or secured in place, thereby providing a way to alter the response of an isolator for a given wavelength of input light.

12 Claims, 6 Drawing Sheets

OPTICAL ISOLATOR

FIELD OF THE INVENTION

This invention relates to an arrangement of optical isolator components and to a method of tuning an optical isolator to have a maximum isolation for an input beam of light having a predetermined wavelength.

BACKGROUND OF THE INVENTION

Optical isolators are one of the most ubiquitous of all passive optical components found in most optical communication systems. Optical isolators are generally used to allow signals to propagate in a forward direction but not in a backward direction. These isolators are often used prevent unwanted back reflections from being transmitted back to a signal's source. It is generally known that optical isolators are to some extent, wavelength dependent devices. They provide a greater amount of isolation for some wavelengths of light and less isolation for other input wavelengths of light.

One prior art polarization independent optical isolator is described in U.S. Pat. No. 5,033,830 issued Jul. 23, 1991 in the name of Jameson and entitled Polarization Independent Optical Isolator. Jameson describes an isolator having a single birefringent plate, a pair of stacked reciprocal rotators, a Faraday rotator, and a reflector positioned in tandem adjacent to the birefringent plate. In a forward (transmitting) direction, a lightwave signal exiting an optical fiber is split into a pair of orthogonal rays by the birefringent plate. The orthogonal rays then pass through a first reciprocal rotator and the Faraday rotator which provides 22.5° of rotation. The rotated rays are then redirected by the reflector back though the Faraday rotator. After passing through the second reciprocal rotator, the orthogonal rays re-enter the same birefringent plate where they are recombined and launched in an output fiber. Since a Faraday rotator is a non-reciprocal device, any signal traveling through the isolator in the reverse (isolation) direction will be split on both passes through the birefringent plate such that neither will intercept the input fiber.

An isolated optical coupler is disclosed in U.S. Pat. No. 5,082,343 in the name of Coult et al. issued Jan. 21, 1992. The coupler described in the patent is comprised of a pair of lenses having a wavelength selective device and an isolator disposed therebetween.

Another optical isolator which attempts to improve upon Coult's design is described in U.S. Pat. No. 5,594,821, issued Jan. 14, 1997 in the name of the applicant, Yihao Cheng.

Yet another optical isolator is described in U.S. Pat. No. 5,267,078 in the name of Shiraishi et al.

Unfortunately, as mentioned heretofore, optical isolators are wavelength dependent devices; as the wavelength of input light varies, the ability of an isolator to provide isolation varies. Thus providing uniformity when manufacturing a large number of devices remains challenging and is often costly. Typically, in the manufacture of isolators, the thickness of components used, such as Faraday rotators, and waveplates, is precisely selected so as to provide maximum isolation for a particular wavelength. Thus, one drawback is that components must be within particular tolerances to provide adequate isolation within predetermined limits at a given wavelength; on the other hand, same components having a different dimensions are required in the manufacture of optical isolators that will operate efficiently at a plurality of different wavelengths. Using prior art methods of construction and manufacture of these devices, once the components are cut to specific dimensions, the isolation response for a given input wavelength of light can be calculated and hitherto, has not been variable within substantial limits.

It is an object of this invention to overcome some of the aforementioned limitations.

It is a further object of the invention to provide a method for fine tuning the maximum isolation response of an isolator with respect to wavelength so the response can be varied within predetermined limits.

SUMMARY OF THE INVENTION

Another aspect of the present invention relates to a method of tuning a polarization independent optical isolator having an isolating portion comprising a first polarizing element, a second polarizing element and a polarization-rotating element fixedly disposed there between for passing a beam of light there through. The isolating portion has a maximum isolation response at a predetermined wavelength of light launched into the optical isolator along a first axis. The method comprises the steps of:

varying the angle at which the beam of light is incident upon the isolating portion by rotating the isolating portion about an axis other than the first axis:

launching a beam of light into an end of the optical isolator directed at another end so that the beam of light traverses the isolating portion; and rotating all of the elements in the isolating portion about the longitudinal axis thereof, simultaneously, to tune the optical isolator until a desired wavelength is measured for a substantially maximum isolation peak.

Another aspect of the present invention relates to a polarization independent isolator comprising: an input port for transmitting a beam of light; an isolating portion; and an output port for receiving the beam of light after traversing the isolating portion. The isolating portion comprises a first polarization element, a second polarization element, and a polarization-rotating element, all or which form a single unit adapted to provide a substantially maximum isolation response in a reverse direction from an output end towards an input end for a given wavelength of light, launched therethrough substantially along a first axis thereof. The isolating portion is oriented so that the beam of light passes through the isolating portion along a line other than the first axis, whereby the polarization independent isolator provides a substantially maximum isolation response at a wavelength other than the given wavelength.

Another feature of the invention relates to a method of tuning a polarization independent optical isolator, having an input end, an output end and an isolating portion. The optical isolator is designed to provide a maximum isolation response in a reverse direction from the output end towards the input end when light at a first wavelength is launched into the optical isolator. The isolating portion comprises a first polarizing element, a second polarizing element and a polarization rotating element disposed there between. The method comprises the steps of: p1 a) launching a beam of light at a second wavelength into an end of the optical isolator and directed at another end so that the beam of light at the second wavelength traverses the isolating portion; and p1 b) tilting the isolating portion with respect to said beam of light to tune the optical isolator until a substantially maximum isolation response is obtained at the second wavelength.

BRIEF DESCRIPTION OF THE DRAWINGS

Exemplary embodiments of the invention will now be described in conjunction with the drawings, in which:

FIGS. 3a and 3b are diagrams illustrating the various states of an input beam launched into the device shown in FIG. 3, at various entry and exit locations;

FIG. 4 is a pictorial view of an isolator in accordance with the invention, shown as a test beam is launched into an output end;

DETAILED DESCRIPTION

Figure 1:
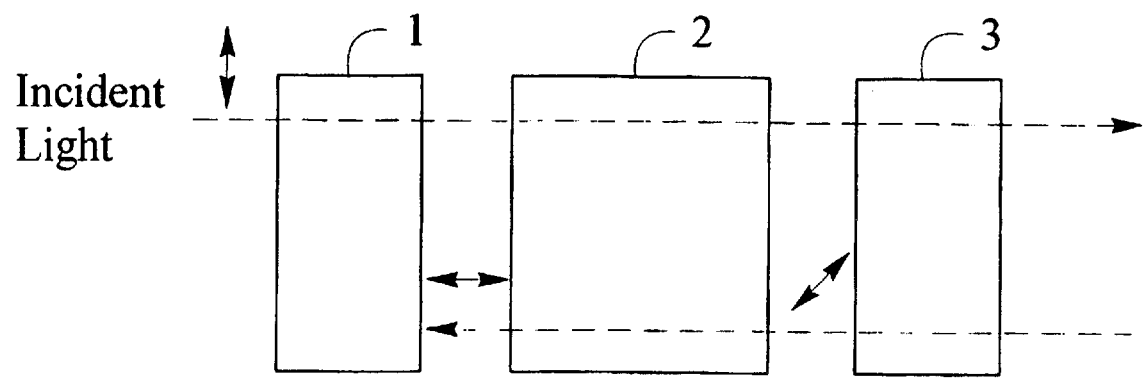
FIG. 1 is a pictorial view block diagram of a prior art polarization dependent optical isolator.

Referring now to FIG. 1, a conventional optical isolator is shown. This isolator is such that after incident light passes through a first polarizer 1, the plane of polarization of the incident light is rotated at an angle of 45° by a Faraday rotator 2 and the incident light further passes through a second polarizer which has the plane of polarization inclined at 45° with respect to the first polarizer For return light reflected in a direction opposite to the incident light on the other hand, only a component of the light which coincides in a plane of polarization with the second polarizer 3 traverses the second polarizer 3 and then the plane of polarization thereof is further rotated at 45° by the Faraday rotator 2. It follows from this that the reflected return light which has traversed the Faraday rotator is such that the plane of polarization is rotated at 90° with respect to the first polarizer 1, and thereby the reflected return light cannot reach the entrance side of the incident light. Hence, according to the conventional optical isolator, the reflected return light in the opposite direction is blocked and the function of the optical isolator of this type is thus performed.

Figure 1A:
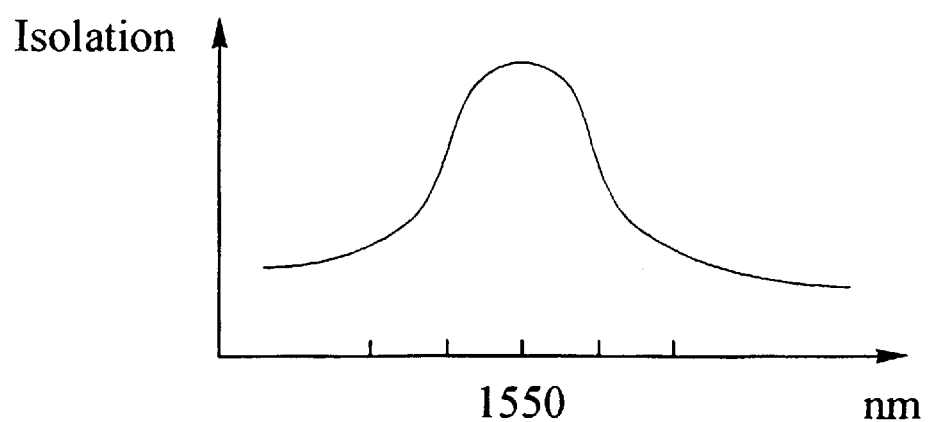
FIG. 1a is a graph of isolation versus wavelength for the isolator shown in FIG. 1.
Figure 2:
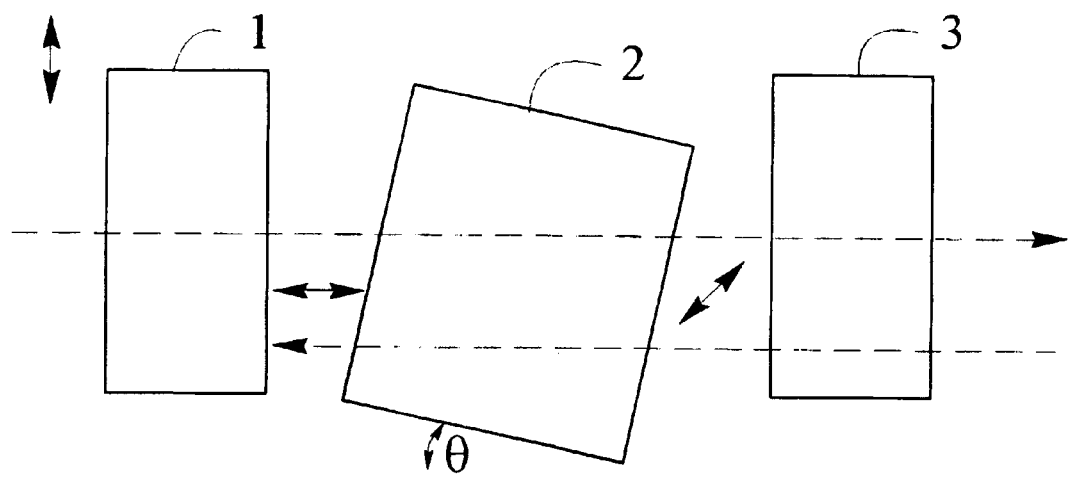
FIG. 2 is a pictorial view of the an optical isolator in accordance with the invention.
Figure 2A:
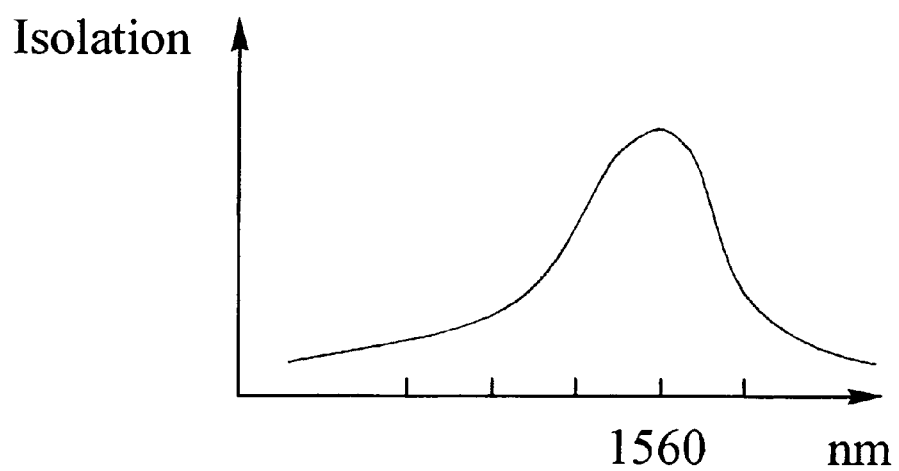
FIG. 2a is a graph of isolation versus wavelength for the isolator shown in FIG. 2.

An embodiment of the invention is shown in FIG. 2, wherein the device of FIG. 1 is oriented in such a manner as to provide an output response which is different from that of FIG. 1, for a same input beam having a same wavelength. This is a result of tilting the device and more particularly, the Faraday rotator 2, with respect to the direction of the input beam, as is shown. In this instance the Faraday rotator 2 is tilted at an angle $\theta_1$ of 5 degrees and a 10 nanometer shift occurs in wavelength for the peak isolation. The graphs of FIG. 1a and FIG. 2b representing the amount of isolation versus wavelength of the devices in FIG. 1 and FIG. 2 respectively, illustrate the effect of tilting the Faraday rotator 2 with respect to the input beam. FIG. 2b illustrates the effect of further tilting at an angle $\theta_2$ of 10 degrees wherein a 20 nanometer shift occurs in wavelength for the peak isolation.

Figure 3:
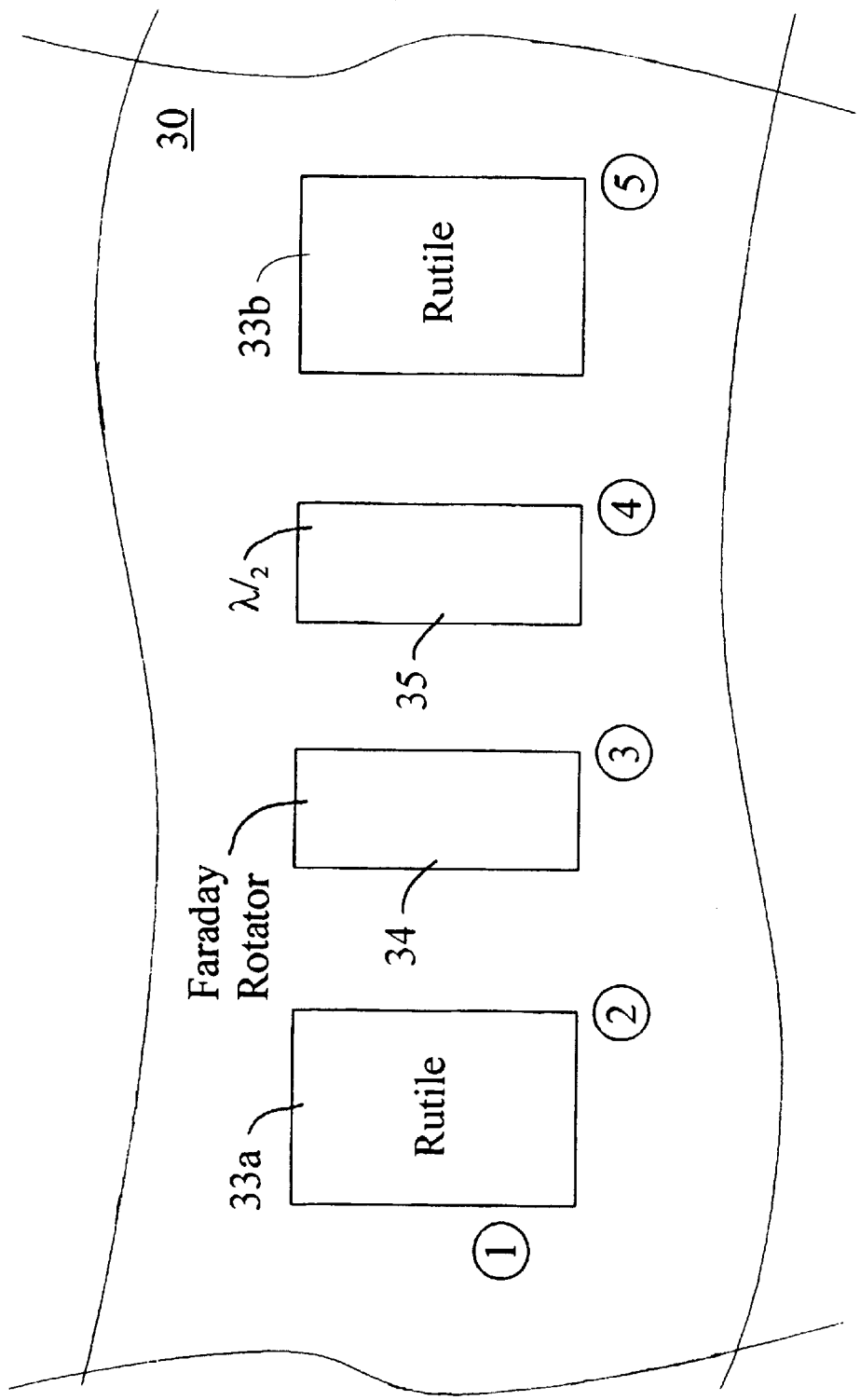
FIG. 3 is a block diagram of a polarization independent optical isolator in accordance with the prior art.

Advantageously, by utilizing this effect, a single device can be optimally tuned to have a peak isolation output response at one of a plurality of wavelengths in dependence upon the angle of incidence of the input light with respect to the input face of the Faraday rotator. Furthermore, and advantageously, in another aspect, a plurality of similar but not identical devices can be tuned to have a same output response for a given wavelength. This of course relaxes required tolerances on the optical components. With reference to FIG. 3 an alternative embodiment of an optical isolator is shown, wherein this isolator 30 is polarization independent and makes use of rutile crystals to separate and combine polarization components. In accordance with the invention, the isolator 30 is shown tilted at an angle of $\theta$ degrees, ($\theta \neq 90+$) with respect to the input beam 32. As described heretofore, the tilt induces a shift in the peak isolation response of the isolator 30. Though the general operation of the isolator 30 is well understood, it will be described briefly with reference to FIG. 3a and FIG. 3b.

The device 30 includes a rutile crystal 33a at an input end for separating an input beam into two orthogonal polarized beams, a non-reciprocal rotator in the form of a Faraday rotator 34, and a half-wave plate 35 adjacent a second rutile crystal 33b for combining the two separate beams into a single beam of light by shifting one of the beams. FIG. 3b depicts the state of the input light at each of the separate components illustrating stages 1 through 5; FIG. 3b further illustrates how any light launched or reflected backwards from stage 5 through to stage 1, substantially prevents coupling to the input port at the input face of the crystal 33a.

Figure 4A:
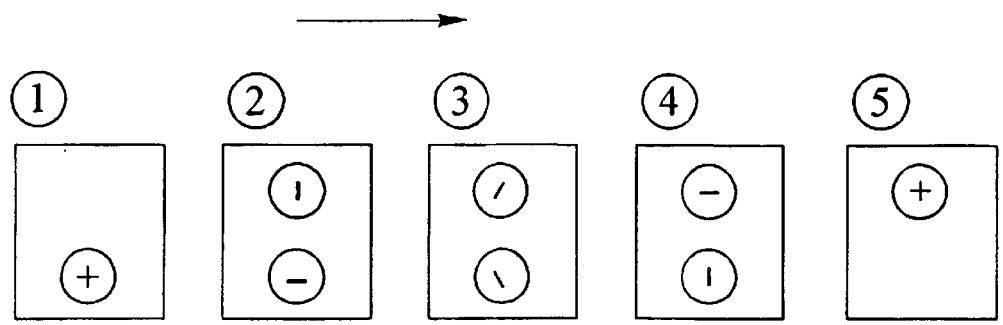
FIGS. 4a and 4b show an isolator in accordance with this invention, wherein the device is tilted with respect to an input beam of light.
Figure 4A:
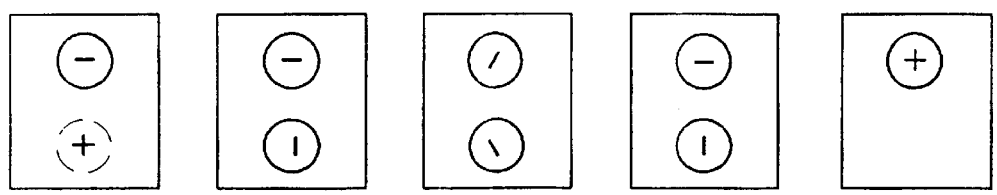
Figure 4A:
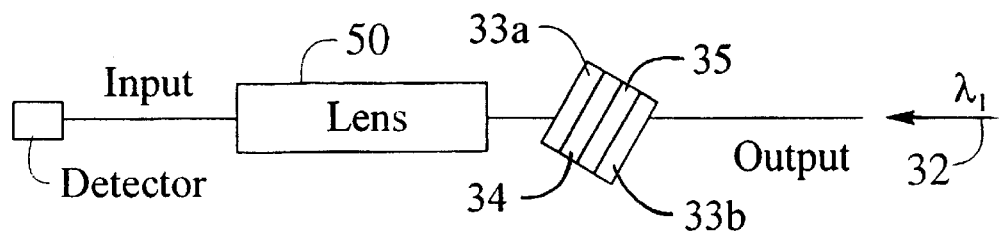
Figure 4B:
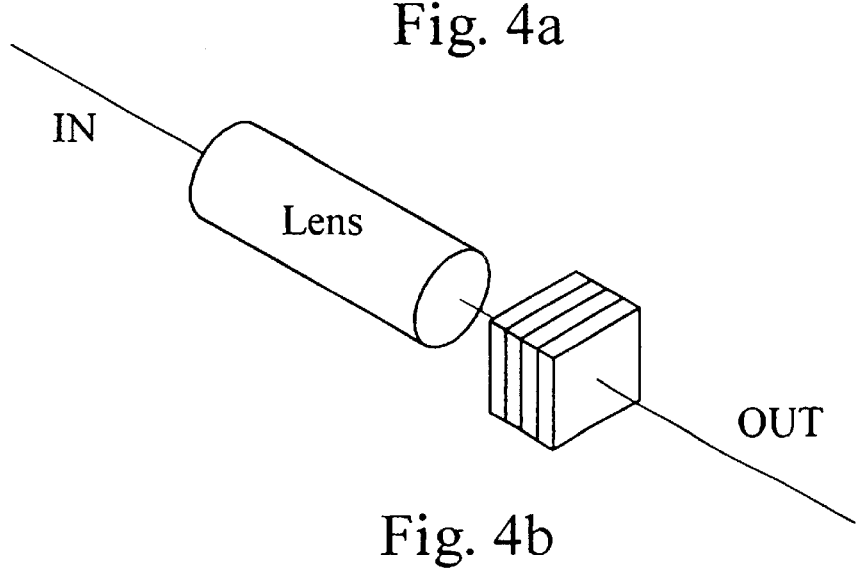

Referring now to FIGS. 4a and 4b, the tuning of a device 30 to function optimally for a given wavelength, for example $\lambda_1$ can be performed in the following manner. An input beam 32 having the desired predetermined wavelength $\lambda_1$ is launched into the output end of the second rutile 33b (corresponding to state 5) so as to be directed toward the input end (at state 1) of the first rutile crystal 33a. The intensity of light at the input end 33a is measured. The device 30 is then tilted by changing the angle at which input light is incident upon the device 30 in small increments to find the optimum angle where the magnitude of the test beam is the least. This location is where the isolator 30 provides the greatest amount of isolation for light of wavelength $\lambda_1$. The components are then glued in place. By manufacturing devices in this manner, the isolation response with respect to input wavelength of light can be varied without changing replacing the components with ones of different thickness.

Test results have shown that an approximately 5 degree shift or tilt of the device 30 will yield a wavelength shift in the isolation peak of approximately 10 nanometers. The limit a device can effectively be tilted, will to some extent depend on the extinction ratio of the component, and therefore there is a maximum limit on the amount of shifting of the isolation peak response by utilizing this method alone.

Figure 5A:
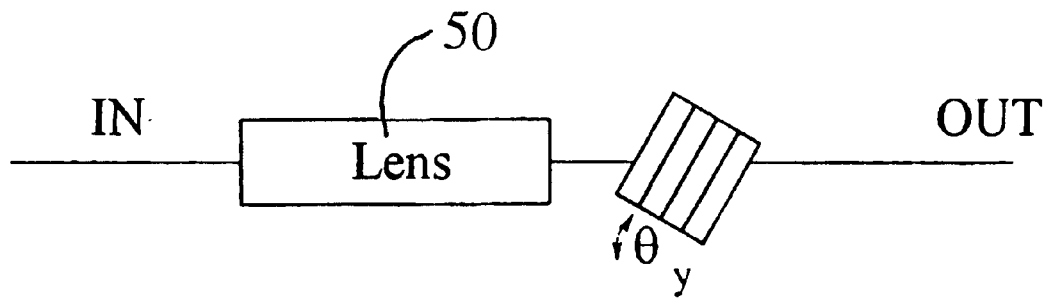
FIGS. 5a and 5b an isolator in accordance with this invention, wherein the device is tilted and rotated with respect to an input beam of light.
Figure 5B:
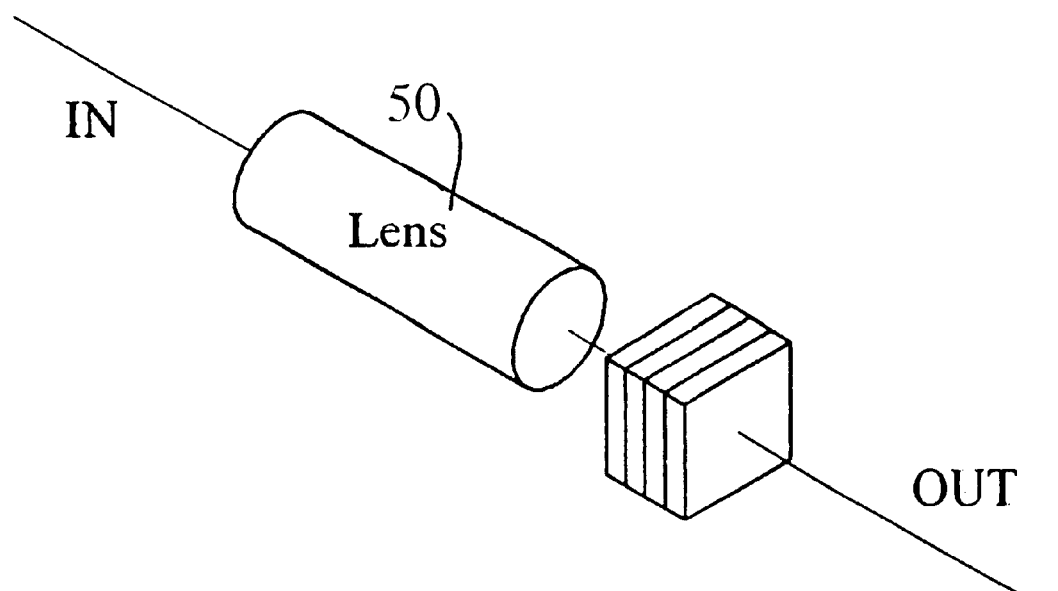

In an additional embodiment of this invention, further shifting of the isolation peak response with wavelength, can be obtained by rotating the device 30 about the input axis of the input light beam, in combination with tilting the device as heretofore described. This is illustrated in FIGS. 5a and 5b. In FIG. 5a, to tune the device 30 to a particular wavelength, input light is launched into the output end of the device. Output test light is detected at the input end face of a lens in the form of a graded-index (GRIN) lens 50; the device 30 shown to be tilted at an angle $\lambda_1$ with respect to the input light and the longitudinal axis of the GRIN lens 50. The amount of tilt is established in accordance with the method of testing described above. However further tuning is performed by rotation of the device 30 as is shown in FIG. 5b wherein the device 30 is shown to be rotated about the axis of the light incident upon the input face of 30. It is generally well known in the art of designing and manufacturing optical isolators that a non-reciprocal rotating device such as a Faraday rotator coupled with a half-wave plate and rutile crystals, will provide isolation for light of a given wavelength dependent upon the thicknesses of these elements. By tilting and rotating the elements with respect to the input beam, the effective thickness and refractive index changes and as a result the normal wavelength at which maximum isolation occurs for elements of a given thickness changes. Rotation can be clockwise or counter clockwise depending upon whether it is desired to have an upward or downward wavelength shift; and, for example, 0.5 nm–5.0 nm/degree at approximately 6° of tilt is attainable. Below is a table of exemplary values for typical rotation expressed in deg/cm at a rotation angle of 45±0.5~I degrees, for specific thicknesses of a material composition of $(BiYbTb)_3Fe_5O_{12}$ as published by Sumitomo Metal and Mining Co. Ltd.

| Model | YTdV | YT5V |
|---|---|---|
| Composition | $(BiYbTb)_3Fe_5O_{12}$ | |
| Wavelength | 1310 | 1550 |
| Thickness ($\mu$m) | ~315 | ~375 |
| Insertion Loss (dB) | <0.1 | |
| Faraday Rotation (deg/cm) | ~–1430 | ~–1200 |
| Extinction Ratio (dB) | >40 | |
| Temperature Coeff. (deg/° C.) | ~0.040 | ~0.055 |
| Saturation Field (Oe) | ~750 | ~1000 |
| Wavelength Coeff. (deg/nm) | ~0.085 | ~0.065 |

Figure 6:
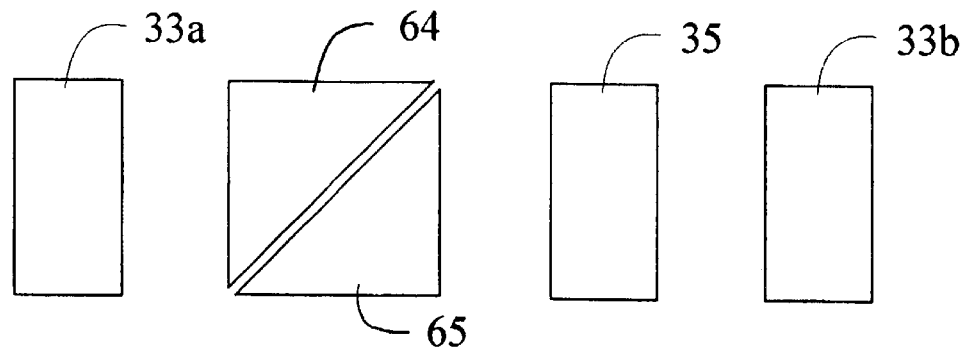
FIG. 6 is a pictorial view of an alternative embodiment of the invention wherein a wedged shaped Faraday rotator adjacent a complementary wedged shaped glass block are disposed adjacent a half waveplate and between two rutile crystals.

Another embodiment of the invention is shown in FIG. 6, wherein an isolator is comprised of input rutile crystal 33a adjacent a wedged shaped Faraday rotator 64 having a glass wedged shaped block adjacent and coupled thereto so as to prevent the beam launched into the rotator 64 and exiting, from bending and veering off its intended path; a half wave plate 35 and rutile 33b sequentially follow the Faraday rotator/glass block. By providing a wedged shaped Faraday rotator, varying the location at which an input beam of light is incident upon the rotator will vary its wavelength isolation peak. For example if light traverses a thicker part of the wedge, the peak isolation of the device will be at a higher wavelength than for light traversing a thinner portion of the wedge of the rotator 64. The effect of utilizing a wedged non-reciprocal rotator, is essentially the same as that of tilting the rotator.

Figure 7:
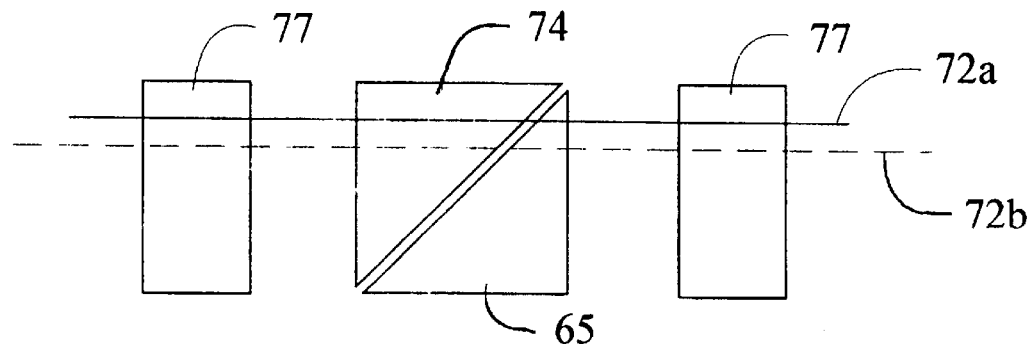
FIG. 7 is a pictorial view of an alternative embodiment of the invention, wherein a wedged shaped non-reciprocal rotating element is disposed between two identical rutile crystals.

FIG. 7 shows yet a more simple embodiment where an isolator consists of two rutile crystals 77, having a wedged shaped Faraday rotator 74 therebetween. Depending upon where the input light is launched, and in accordance with which path the input light traverses the Faraday rotator 74, a different peak isolation wavelength will be attained. For example, the solid line 72a in FIG. 7 indicating a first path and the dotted line 72b indicating a second path, provide different wavelength isolation peaks. By using this effect and in accordance with the teachings of this invention heretofore described, a test beam can be launched at an output end directed toward the input end, for a given input beam of a known wavelength; and, by varying the location at which the test beam is launched at the output end, light at the input end can be minimized, thereby providing an isolation peak or maximum amount of isolation for a test beam. Once the optimum location at the output end is determined a port can be fixed at this location.

Figure 8:
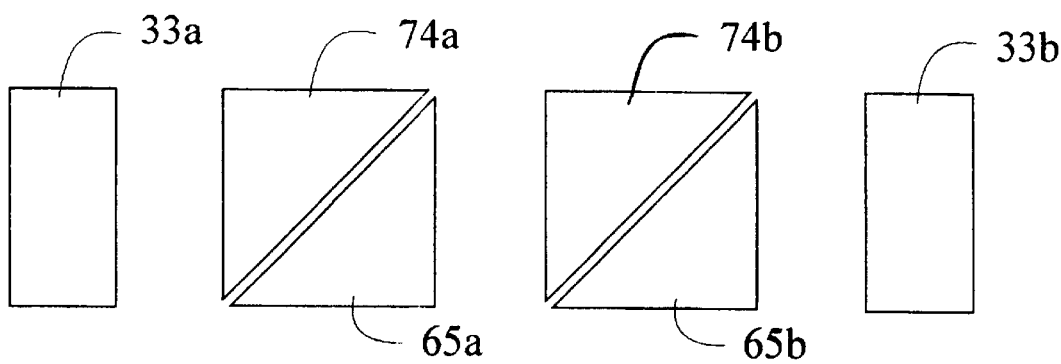
FIG. 8 is a pictorial view of another embodiment of the invention, wherein two wedged shaped Faraday rotators are used to provide two isolation peaks at two separate distinct wavelengths; and, FIG. 9 is a pictorial view of another embodiment including a wedged shaped Faraday rotator; and a wedged shaped half waveplate.

In FIG. 8, yet a further embodiment is shown, similar in many respects to that of FIG. 7, however wherein two wedged shaped Faraday rotators 74a and 74b are provided, having complementary glass blocks 65a and 65b respectively. This embodiment provides a means of providing an isolator that will have two distinct isolation peaks each at two predetermined wavelengths. By using this arrangement and launching a test beam into the output end, a greater number of wavelengths can be isolated.

Figure 9:
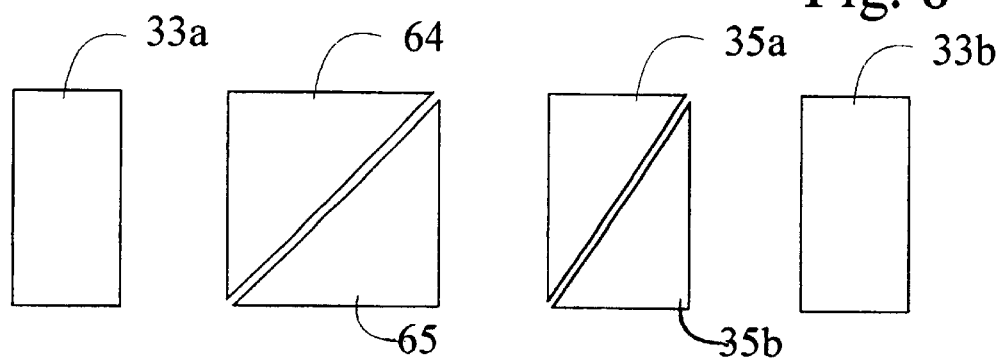

The embodiment shown in FIG. 9 provides a means for achieving additional wavelength shifting, by having a wedged shaped Faraday rotator 64, and a wedged shaped half waveplate 35a. Glass blocks 65 and 35b are butted against the rotator 64 and half waveplate 35a respectively. Further shifting can also be attained by rotation of the these elements as described heretofore.

Of course various other embodiments may be envisaged, without departing from the sprit and scope of the invention. For example, the invention may be utilized in the following manner. By providing both a Faraday rotator, and a half wave plate, and having the rotators tilted a predetermined angle, tuning may be achieved only through rotation of the rotators without changing the angle of tilt.

Accordingly, the present invention relates to a method of tuning a polarization independent optical isolator. The isolator includes an input end, an output end and an isolating portion. The isolating, poition comprises a first polarizing element, a second polarizing element and a polarization-rotating element disposed there between. The isolating portion provides a maximum isolation response at a predetermined wavelength in a reverse direction from the output end towards the input end, when light is launched into the optical isolator. The method comprises the steps of:

a) launching a beam of light, having a longitudinal axis, into an end of the optical isolator and directed at another end so that the beam of light traverses the isolating portion; and b) varying the orientation of all the elements in the isolating portion, simultaneously, with respect to said beam of light including rotating the isolating portion about a longitudinal axis thereof, and varying the angle at which the beam of light is incident upon the isolating portion to tune the optical isolator until a desired wavelength, other than the predetermined wavelength, is measured for a substantially maximum isolation peak.

Another aspect of the prcsenlt invention relates to a imnethod of tunning a polarization independent optical isolator having an isolating portion conprising a first polarizing element, a second polarizing element and a polariziation-rotating element fixedly disposed there between for passing a beam of light there tlhough. The isolating portion has a maximum isolation response at a predetermined wavelength of light launched into the optical isolator along a first axis. The method comprises the steps of: varying the angle at which the beam of light is incident upon the isolating portion by rotating the isolating portion about an axis other than the first axis: launching a beam of light into an end of the optical isolator directed at another end so that the beam of light traverses the isolating portion; and rotating all of the elements in the isolating portion about the lingitudinal axis thereof, simultaneously, to tune the optical isolator until a desired wavelength is measured for a substantially maximum isolation peak.

Another aspect of the present invention relates to a polarization independent isolator comprising: an input port for transmitting a beam of light; an isolating portion; and an output port for receiving the beam of light after traversing the isolating portion. The isolating portion comprises a first polarization element, a second polarization element, and a polarization-rotatin element, all or which form a single unit adapted to provide a substantially maximum isolation response in a reverse direction from an output end towards an input end for a given wavelength of light, launched therethrough substantially along a first axis thereof. The isolating portion is oriented so that the beam of light passes through the isolating portion along a line other than the first axis, whereby the polarization independent isolator provides a substantially maximum isolation response at a wavelength other than the given wavelength.

Another feature of the incention relates to a method of tuning a polarization independent optical isolator, having an input end, an output end and an isolating portion. The optical isolator is designed to provide a maximum isolation response in a reverse direction from the output end towards the input end when light at a first wavelength is launched into the optical isolator. The isolating portion comprises a first polarizing element, a second polarizing element and a polarization rotating element disposed there between. The method comprises the steps of: a) launching a beam of light at a second wavelength into an end of the optical isolator and directed at another end so that the beam of light at the second wavelength traverses the isolating portion; and b) tilting the isolating portion with respect to said beam of light to tune the optical isolatoir unti i a substantially maximurn isolation response is obtai ned at the second wavelength.

What is claim is:

1. A method of tuning a polarization independent optical isolator, having an input end, an output end and an isolating portion, for providing a maximum isolation response at a predetermined wavelength in a reverse direction from the output end towards the input end when light is launched into the optical isolator, the isolating portion comprising a first polarizing element, a second polarizing element and a polarization rotating element disposed there between, the method comprising the steps of:
   a) launching a beam of light, having a longitudinal axis, into an end of the optical isolator and directed at another end so that the beam of light traverses the isolating poition; and
   b) varying the orientation of all the elements in the isolating portion, simultaneously, with respect to said beam of light including rotating the isolating portion about a longitudinal axis thereof, and varying the angle at which the beam of light is incident upon the isolating portion to tune the optical isolator until a desired wavelength, other than the predetermined wavelength, is measured for a substantially maximum isolation peak.

2. The method according to claim 1, wherein the step of varying the orientation includes rotating the isolating portion about an axis other than the longitudinal axis of the beam.

3. The method according to claim 1, wherein the step of varying the orientation includes rotating the isolating portion about an axis perpendicular to the longitudinal axis of the beam.

4. The method according to claim 1, further comprising, after step a), tuning a maximum isolation response to the predetermined wavelength.

5. The method according to claim 4, further comprising the step of fixing elements of the isolating portion in place after the desired wavelength having a maximum isolation is achieved.

6. The method according to claim 4, further comprising the step of fixing the isolating portion in place after the desired wavelength having a maximum isolation is achieved.

7. A method of tuning a polarization independent optical isolator having an isolating portion comprising a first polarizing element, a second polarizing element and a polarization-rotating element, fixedly disposed there between, for passing a beam of light there through, the isolating portion having a maximum isolation response at a predetermined wavelength of light launched into the optical isolator along a first axis, the method comprising the steps of:
   varying the angle at which the beam of light is incident upon the isolating portion by rotating the isolating portion about an axis other than the first axis;
   launching a beam of light into an end of the optical isolator directed at another end so that the beam traverses the isolating portion; and
   rotating all of the elements in the isolating portion about a longitudinal axis thereof, simultaneously, to tune the optical isolator until a desired wavelength, other than the predetermined wavelength, is measured for a substantially maximum isolation peak.

8. The method according to claim 7, wherein the first axis is a longitudinal major axis of the isolating portion.

9. The method according to claim 7, further comprising varying the orientation of one or more of the elements of the isolating portion, independently of the other elements of the isolating portion, for tuning a maximum isolation response at a desired wavelength.

10. The method according to claim 9, further comprising fixing the isolator portion in place after the maximum isolation response is achieved.

11. A method of tuning a polarization independent optical isolator, having an input end, an output end and an isolating portion, the optical isolator designed to provide a maximum isolation response in a reverse direction from the output end towards the input end when light at a first wavelength is launched into the optical isolator, the isolating portion comprising a first polarizing element, a second polarizing element and a polarization rotating element disposed there between, the method comprising the steps of:
   a) launching a beam of light at a second wavelength into an end of the optical isolator and directed at another end so that the beam of light at the second wavelength traverses the isolating portion: and
   b) tilting the isolating portion with respect to said beam of light to tune the optical isolator until a substantially maximum isolation response is obtained at the second wavelength.

12. The method according to claim 11, further comprising rotating the isolating portion about a longitudinal axis thereof to fine tune the isolation response at the second wavelength.

* * * * *